United States Patent
Schad et al.

(10) Patent No.: US 11,235,501 B2
(45) Date of Patent: Feb. 1, 2022

(54) INJECTION MOLDING MACHINE FOR MOLDING PREFORMS

(71) Applicant: Niigon Machines Ltd., Vaughan (CA)

(72) Inventors: Robert D. Schad, Toronto (CA); Roberto Sicilia, Mississauga (CA)

(73) Assignee: Niigon Machines Ltd., Vaughan (CA)

( * ) Notice: Subject to any disclaimer, the term of this patent is extended or adjusted under 35 U.S.C. 154(b) by 155 days.

(21) Appl. No.: 16/541,460

(22) Filed: Aug. 15, 2019

(65) Prior Publication Data
US 2019/0366609 A1 Dec. 5, 2019

Related U.S. Application Data

(63) Continuation of application No. PCT/CA2018/050209, filed on Feb. 23, 2018.
(Continued)

(51) Int. Cl.
*B29C 45/32* (2006.01)
*B29B 11/08* (2006.01)
(Continued)

(52) U.S. Cl.
CPC .............. *B29C 45/32* (2013.01); *B29B 11/08* (2013.01); *B29C 45/42* (2013.01);
(Continued)

(58) Field of Classification Search
CPC ... B29B 11/08; B29C 45/32; B29C 2045/725; B29C 2045/7214; B29C 45/4225; B29C 45/7626
See application file for complete search history.

(56) References Cited

U.S. PATENT DOCUMENTS

| 4,836,767 A | 6/1989 | Schad et al. |
| 5,773,049 A | 6/1998 | Kashiwa et al. |

(Continued)

FOREIGN PATENT DOCUMENTS

| CA | 2607310 A1 | 4/2009 |
| DE | 19519586 A1 | 12/1996 |

(Continued)

OTHER PUBLICATIONS

Koch EP2923814 English Translation 2015 (Year: 2015).*
(Continued)

*Primary Examiner* — Jacob T Minskey
*Assistant Examiner* — Adrien J Bernard
(74) *Attorney, Agent, or Firm* — Bereskin & Parr LLP/S.E.N.C.R.L, s.r.l.

(57) ABSTRACT

An injection molding machine includes a machine base extending along a horizontal machine axis; a stationary platen fixed to the base; a moving platen supported by the base; a center section supported by the base axially intermediate the stationary and moving platens; at least one mold stroke actuator for translating the moving platen and the center section along the machine axis between a mold-open position and a mold-closed position; a two-stage first injection unit supported by the base behind the stationary platen for injecting a first resin through the stationary platen; and a two-stage second injection unit supported by the base behind the moving platen for injecting a second resin through the moving platen. The second injection unit is translatable along the machine axis to accommodate translation of the moving platen during movement between the mold-open and mold-closed positions.

28 Claims, 7 Drawing Sheets

Related U.S. Application Data

(60) Provisional application No. 62/463,416, filed on Feb. 24, 2017.

(51) Int. Cl.
  *B29C 45/42* (2006.01)
  *B29C 45/72* (2006.01)
  *B29K 105/00* (2006.01)

(52) U.S. Cl.
  CPC .... *B29C 45/7207* (2013.01); *B29C 2045/725* (2013.01); *B29K 2105/258* (2013.01)

(56) References Cited

U.S. PATENT DOCUMENTS

| | | | |
|---|---|---|---|
| 6,817,855 B2 | 11/2004 | Unterlander et al. | |
| 7,306,445 B2 | 12/2007 | Wobbe et al. | |
| 2005/0127569 A1* | 6/2005 | Di Simone | B29C 45/4225 264/334 |
| 2009/0065973 A1* | 3/2009 | Jung | B29C 45/1615 264/254 |
| 2014/0374956 A1 | 12/2014 | Schad et al. | |
| 2016/0129616 A1 | 5/2016 | Schad | |

FOREIGN PATENT DOCUMENTS

| | | | |
|---|---|---|---|
| DE | 10243130 B3 | 4/2004 | |
| DE | 2923814 * | 9/2015 | ............ B29B 11/08 |
| DE | 112014002134 T5 | 2/2016 | |
| EP | 0358104 A2 | 3/1990 | |
| EP | 0947304 A2 | 10/1999 | |
| EP | 1174242 A2 | 1/2002 | |
| EP | 1297940 A1 | 4/2003 | |
| JP | 5633979 B2 | 10/2014 | |
| WO | 2012037686 A1 | 3/2012 | |

OTHER PUBLICATIONS

International Search Report and Written Opinion of corresponding International Application No. PCT/CA2018/050209 dated Apr. 26, 2018, 9 Pages.

* cited by examiner

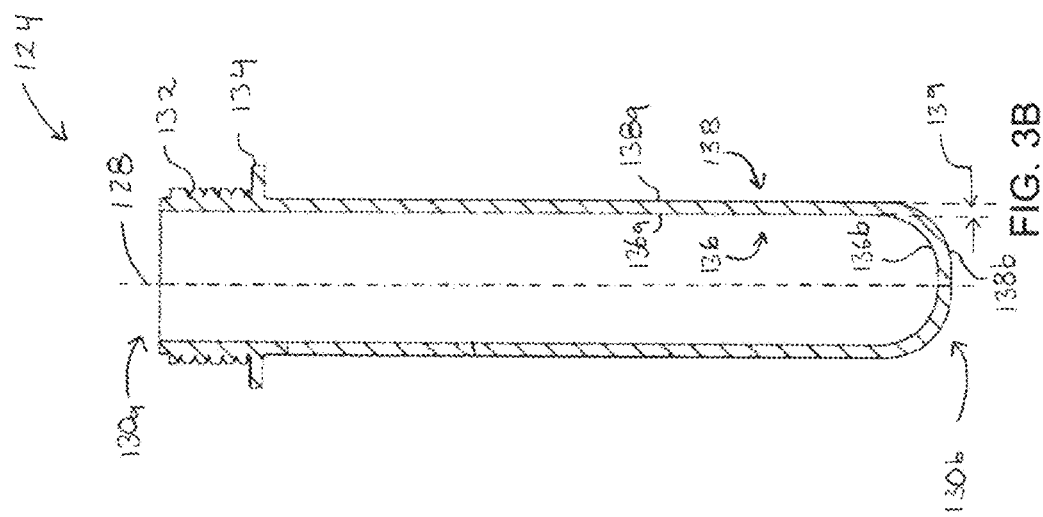
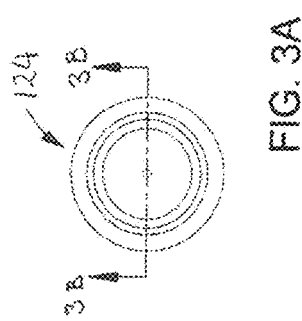
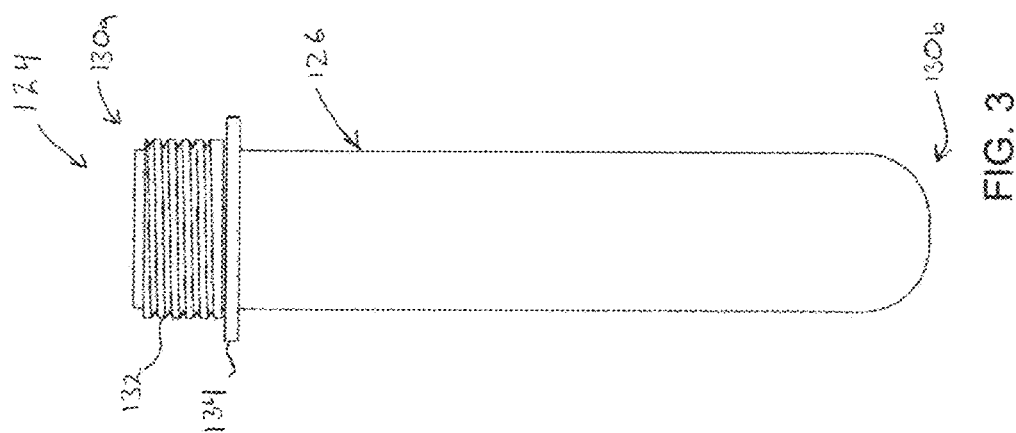

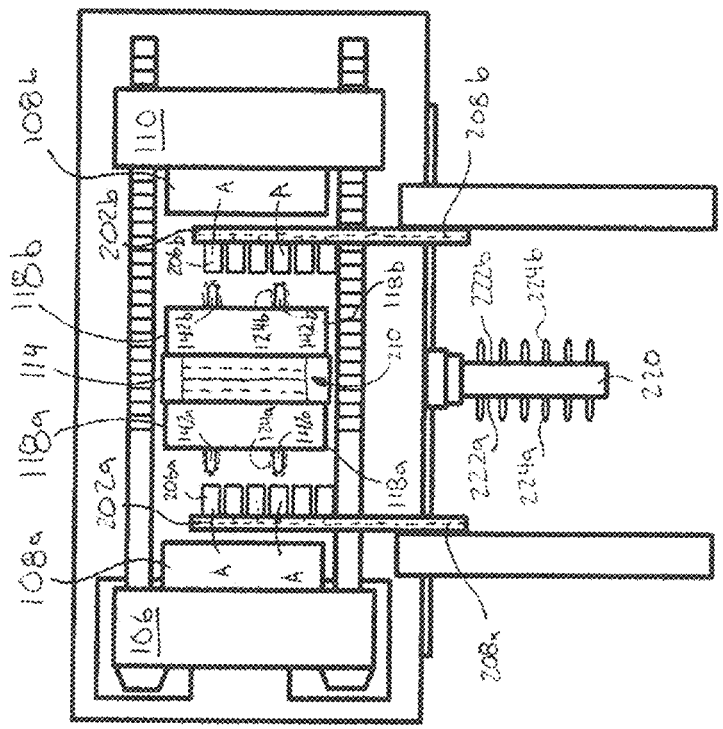
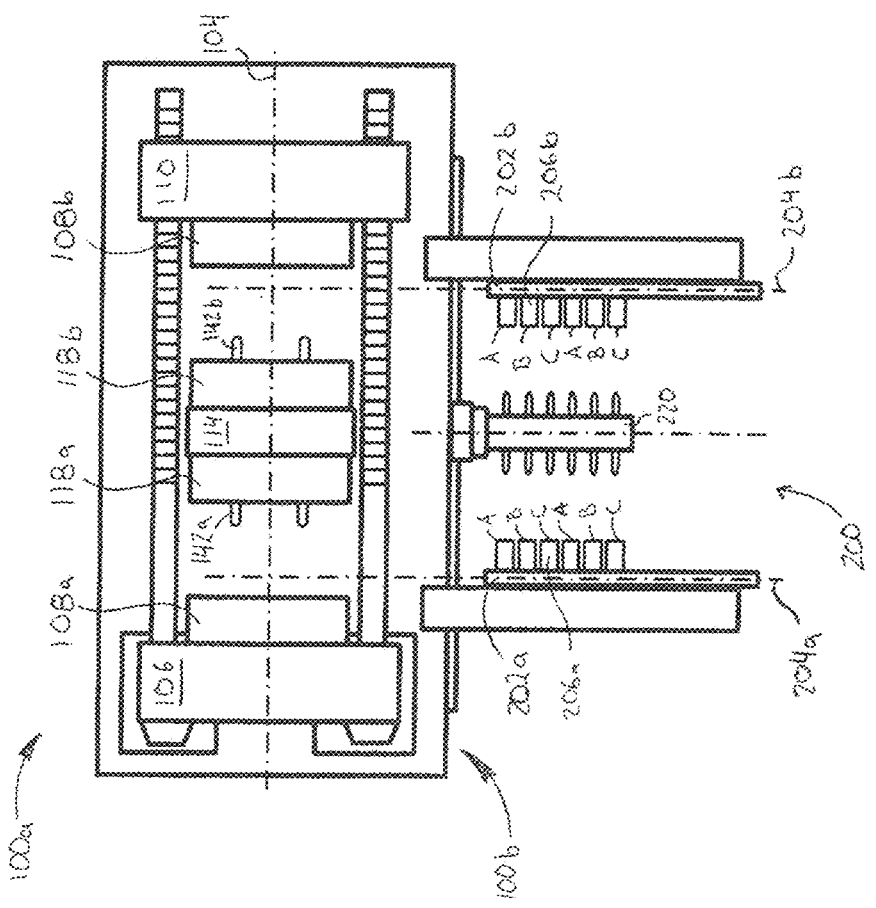
FIG. 6
FIG. 5

INJECTION MOLDING MACHINE FOR MOLDING PREFORMS

This application is a continuation of International Patent Application No. PCT/CA2018/050209, filed Feb. 23, 2018, which claims the benefit of Provisional Application Ser. No. 62/463,416, filed Feb. 24, 2017, which is hereby incorporated herein by reference.

FIELD

The specification relates to injection molding machines for forming and handling molded preforms, and methods of operating same.

BACKGROUND

U.S. Pat. App. Pub. No. 2014/0374956A1 (Schad et al.) discloses an injection molding machine including a base; a pair of platens supported by the base, the platens supporting respective mold halves to form a mold; and a part-handling apparatus for holding and treating articles from the mold, the part handling apparatus separate from the mold. The part handling apparatus includes a take-out plate including at least one set of first cooling receivers for receiving and retaining a first set of molded articles from the mold, the first cooling receivers conductively transferring a first amount of thermal energy away from the first molded articles; and a supplemental cooling plate comprising at least one set of second cooling receivers for receiving and retaining the first set of articles; and the second cooling receivers conductively transferring a second amount of thermal energy away from the first molded articles.

U.S. Pat. No. 5,773,049 (Kashiwa et al.) discloses a two-layer foam injection molding machine for molding foam moldings in which a surface member composed of a foam layer and a skin layer on the surface of the foam layer is laminated in a body on a core member made from a hard resin. The two-layer foam injection molding machine comprises, mainly, a fixed plate attached to a primary mold for molding the core member and provided with a primary injection unit for supplying the core member; a rotary plate arranged so as to be openable and closable from and to the fixed plate and having a pair of a first mold facing the primary mold and a second mold, for molding the surface member, facing a secondary mold and having the same shape as the first mold, in a manner capable of switching them by turning; a movable plate arranged so as to be openable and closable from and to the rotary plate, attached to the secondary mold and provided with a secondary injection unit; first mold clamping means for clamping the primary mold of the fixed plate and the first mold or the second mold of the rotary plate; second mold clamping means for clamping the secondary mold of the movable plate and the second mold or the first mold of the rotary plate; and mold opening means provided so as to separate the movable plate and the rotary plate to provide a space between the second mold or the first mold and the secondary mold held to be openable.

U.S. Pat. No. 7,306,445 (Wobbe et al.) discloses a mold closing device of an injection molding machine for producing plastic parts made of two or more plastic components. A central mold carrier element is arranged between two outer mold mounting plates and has two or four opposing mold mounting areas arranged in pairs for affixing two or four mold halves and which is fitted with a turning device supported in a supporting frame. Each of the mold halves of the mold carrier element can be closed against the mold halves of the outer mold mounting plates by a drive mechanism and a mold pressure unit. The outer mold mounting plates are interconnected by columns which extend through the supporting frame for the central mold carrier element. The supporting frame is fixedly connected to the machine frame while the outer mold mounting plate is displaceably supported on the machine frame.

SUMMARY

The following summary is intended to introduce the reader to various aspects of the applicant's teaching, but not to define any invention. In general, disclosed herein are one or more methods or apparatuses related to injection molding.

According to some aspects, an injection molding machine includes (a) a machine base extending along a horizontal machine axis; (b) a stationary platen fixed to the base for supporting a first cavity mold half; and (c) a moving platen supported by the base and translatable along the machine axis towards and away from the stationary platen. The moving platen is for supporting a second cavity mold half.

The machine further includes (d) a center section supported by the base axially intermediate the stationary and moving platens. The center section has a center section first face for supporting a first core mold half and a center section second face opposite the center section first face for supporting a second core mold half. The moving platen and the center section are translatable along the machine axis between a mold-open position, in which the first cavity mold half is spaced axially apart from the first core mold half and the second cavity mold half is spaced axially apart from the second core mold half, and a mold-closed position, in which the first cavity mold half is in engagement with the first core mold half to define a set of first mold cavities for forming a set of molded first preforms, and in which the second cavity mold half is in engagement with the second core mold half to define a set of second mold cavities for forming a set of molded second preforms.

The machine further includes (e) a first take-out plate on a non-operator side of the machine. In some examples, the first take-out plate is supported by the base. The first take-out plate is moveable relative to the base between at least one first advanced position for reaching between the first cavity mold half and the first core mold half when the moving platen and center section are in the mold-open position to facilitate transfer of the first preforms from the first core mold half to retained engagement on the first take-out plate, and a first retracted position in which the first take-out plate is clear of the first cavity mold half and the first core mold half.

The machine further includes (f) a second take-out plate on the non-operator side of the machine. In some examples, the second take-out plate is supported by the base. The second take-out plate is moveable relative to the base between at least one second advanced position for reaching between the second cavity mold half and the second core mold half when the moving platen and the center section are in the mold-open position to facilitate transfer of the second preforms from the second core mold half to retained engagement on the second take-out plate, and a second retracted position in which the second take-out plate is clear of the second cavity mold half and the second core mold half.

In some examples, the first take-out plate translates along a horizontal first take-out plate axis between advanced and retracted positions, and the second take-out plate translates along a horizontal second take-out plate axis between the second advanced and retracted positions. The first and second take-out plate axes are perpendicular to the machine axis.

In some examples, the first take-out plate includes at least one set of first cooling tubes for retaining and cooling the first preforms and at least one first internal fluid conduit for conducting coolant to and from the first cooling tubes. The second take-out plate includes at least one set of second cooling tubes for retaining and cooling the second preforms and at least one second internal fluid conduit for conducting coolant to and from the second cooling tubes.

In some examples, the first take-out plate includes a set of set-A first cooling tubes and a set of set-B first cooling tubes, and the first take-out plate is translatable to a set-A first advanced position for aligning the set-A first cooling tubes with first mold core pins of the first core mold half, and a set-B first advanced position for aligning the set-B first cooling tubes with the first mold core pins. The set-A and set-B first advanced positions are offset from each other along the first take-out plate axis.

In some examples, the second take-out plate includes a set of set-A second cooling tubes and a set of set-B second cooling tubes, and the second take-out plate is translatable to a set-A second advanced position for aligning the set-A second cooling tubes with second mold core pins of the second core mold half, and a set-B second advanced position for aligning the set-B second cooling tubes with the second mold core pins. The set-A and set-B second advanced positions are offset from each other along the second take-out plate axis.

In some examples, the machine further includes a transfer shell on the non-operator side of the machine axially intermediate the first and second take-out plates. In some examples, the transfer shell is supported by the base. The transfer shell includes a shell first face having a set of first transfer pins protruding therefrom for retaining the first preforms, and a shell second face opposite the shell first face. The shell second face has a set of second transfer pins protruding therefrom for retaining the second preforms.

In some examples, when in the first retracted position, the first take-out plate is translatable parallel to the machine axis toward the transfer shell to a first shell-transfer position to facilitate transfer of the first preforms to retained engagement on the first transfer pins. When in the second retracted position, the second take-out plate is translatable parallel to the machine axis toward the transfer shell to a second shell-transfer position to facilitate transfer of the second preforms to retained engagement on the second transfer pins.

In some examples, the transfer shell is rotatable about a horizontal shell axis generally perpendicular to the machine axis. The transfer shell is rotatable among a load position in which the shell first face is directed axially toward the first take-out plate and the shell second face is directed axially toward the second take-out plate, a first unload position in which the shell first face is directed downwardly for releasing the first preforms from the shell, and a second unload position in which the shell second face is directed downwardly for releasing the second preforms from the transfer shell.

According to some aspects, a method of handling injection molded preforms includes (a) translating a first take-out plate perpendicular to a machine axis to a first advanced position between a first cavity mold half supported by a stationary platen and a first core mold half supported by a center mold section, and translating a second take-out plate perpendicular to the machine axis to a second advanced position between a second cavity mold half supported by a moving platen and a second core mold half supported by the center mold section opposite the first core mold half. The method further includes (b) after step (a), transferring a set of molded first preforms from the first core mold half to retained engagement on the first take-out plate, and transferring a set of molded second preforms from the second core mold half to retained engagement on the second take-out plate. The method further includes (c) after step (b), translating the first take-out plate to a first retracted position clear of the first cavity mold half and the first core mold half, and translating the second take-out plate to a second retracted position clear of the second cavity mold half and the second core mold half.

In some examples, the method further includes (d), after step (c), transferring the first and second preforms from the first and second take-out plates to retained engagement on a transfer shell axially intermediate the first and second take-out plates.

In some examples, the method further includes, after step (c) and prior to step (d), translating each of the first and second take-out plates parallel to the machine axis toward the transfer shell.

According to some aspects, an injection molding machine for molding preforms includes (a) a machine base extending along a horizontal machine axis; (b) a stationary platen fixed to a platen support portion of the base for supporting a first cavity mold half; and (c) a moving platen supported by the platen support portion and spaced axially apart from the stationary platen. The moving platen is for supporting a second cavity mold half.

The machine further includes (d) a center section supported by the platen support portion axially intermediate the stationary and moving platens. The center section has a center section first face for supporting a first core mold half and a center section second face opposite the center section first face for supporting a second core mold half. The moving platen and the center section are translatable along the machine axis between a mold-open position, in which the first cavity mold half is spaced axially apart from the first core mold half and the second cavity mold half is spaced axially apart from the second core mold half, and a mold-closed position, in which the first cavity mold half is in engagement with the first core mold half to define a set of first mold cavities for forming a set of molded first preforms, and in which the second cavity mold half is in engagement with the second core mold half to define a set of second mold cavities for forming a set of molded second preforms.

The machine further includes (e) a two-stage first injection unit supported by a first injection unit support portion of the base and positioned behind the stationary platen for injecting a first resin into the first mold cavities through the stationary platen. The first injection unit includes a first plasticizing apparatus for plasticizing the first resin and a first plunger apparatus transversely offset from the first plasticizing apparatus for receiving the first resin from the first plasticizing apparatus and forcing the first resin into the first mold cavities through a first nozzle of the second injection unit.

The machine further includes (f) a two-stage second injection unit supported by a second injection unit support portion of the base and positioned axially behind the moving platen for injecting a second resin into the second mold cavities through the moving platen. The second injection unit includes a second plasticizing apparatus for plasticizing the second resin and a second plunger apparatus transversely offset from the second plasticizing apparatus for receiving the second resin from the second plasticizing apparatus and forcing the second resin into the second mold cavities through a second nozzle of the second injection unit. The second injection unit is translatable along the machine axis between an injection unit advanced position corresponding to the mold-closed position of the moving platen and an injection unit retracted position corresponding to the mold-open position of the moving platen to accommodate translation of the moving platen during movement between the mold-open and mold-closed positions.

In some examples, the second nozzle is in a fixed position relative to the moving platen during machine operation (i.e. during injection, and during translation of the moving platen and the center section between the mold-open and mold-closed positions and translation of the second injection unit between the injection unit advanced and retracted positions). In some examples, the machine includes at least one sprue engagement actuator coupled to the second injection unit for holding the second nozzle in engagement with a sprue of the second cavity mold half during machine operation. In some examples, the sprue engagement actuator includes at least one hydraulic cylinder connected at one end to the moving platen and at an opposite end to the second plunger apparatus.

In some examples, the machine includes a stroke assembly for translating the moving platen and center mold section between the mold-open and mold-closed positions and the second injection unit between the injection unit advanced and retracted positions.

In some examples, the stroke assembly includes at least one mold stroke actuator mounted to the base and coupled to the moving platen for translating the moving platen along the machine axis. In some examples the mold stroke actuator(s) is/are mounted to the platen support portion. In some examples, the stroke assembly includes at least one injection unit stroke actuator mounted to the base and coupled to the second injection unit for translating the second injection unit along the machine axis. In some examples, the injection unit stroke actuator(s) is/are mounted to the second injection unit support portion. In some examples, the stroke assembly includes both kinds of stroke actuators, i.e. at least one mold stroke actuator and at least one injection unit stroke actuator.

In some examples, the injection unit stroke actuator is operable to translate the second injection unit along the machine axis over at least an injection unit stroke length. The injection unit stroke length is equal to a mold stroke length that the moving platen traverses axially when moving between the mold-open and mold-closed positions. In some examples, the injection unit stroke actuator provides at least a portion of an injection unit stroke force required to translate the second injection unit over the injection unit stroke length, and the mold stroke actuator provides at least a portion of a mold stroke force required to translate the moving platen and the center section between the mold-open and mold-closed positions. In some examples, a sum of the injection unit stroke force and the mold stroke force is provided by a combination of the mold stroke actuator and the injection unit stroke actuator.

In some examples, the injection unit actuator includes an injection unit ball screw mounted to the second injection unit support portion and driven by an injection unit stroke drive.

In some examples, the at least one mold stroke actuator includes a mold stroke ball screw mounted to the base and coupled to the moving platen, and driven by a mold stroke drive. In some examples, the at least one mold stroke actuator comprise dual mold stroke ball screws mounted to the base in parallel to each other and to the machine axis.

In some examples, the first and second injection units are interchangeable with each other.

According to some aspects, a method of operating an injection molding machine for molding preforms includes (a) plasticizing a first resin in a first plasticizing apparatus of a two-stage first injection unit supported behind a stationary platen, and plasticizing a second resin in a second plasticizing apparatus of a two-stage second injection unit supported behind a moving platen; and (b) forcing the first resin from a first shooting pot transversely offset from the first plasticizing apparatus through the stationary platen and into a set of first mold cavities to form a set of molded first preforms. The first mold cavities are defined by a first cavity mold half supported by the stationary platen and a first core mold half supported by a center mold section. The method further includes (c) forcing the second resin from a second shooting pot transversely offset from the second plasticizing apparatus through the moving platen and into a set of second mold cavities to form a set of molded second preforms. The second mold cavities are defined by a second cavity mold half supported by the moving platen and a second core mold half supported by the center mold section opposite the first core mold half.

In some examples, the method further includes, after step (c), (d) energizing a mold stroke actuator to provide at least a portion of a mold stroke force required to translate the moving platen and the center section away from the stationary platen to open the mold. In some examples, the method further includes during step (d), (e) energizing an injection unit stroke actuator to provide at least a portion of an injection unit stroke force required to translate the second injection unit away from the stationary platen to accommodate translation of the moving platen.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 3 is a side view of an example molded preform formed by a machine like that of FIG. 1;

FIG. 3A is a top view of the preform of FIG. 3;

FIG. 3B is a cross-sectional view taken along line 3B-3B of the preform of FIG. 3A;

FIG. 5 is a schematic top view of clamp and part-handling portions of the machine of FIG. 1, showing take-out plates of the part-handling portions in a retracted condition and a transfer shell of the part-handling portions in a load condition;

FIG. 6 is a schematic top view like that of FIG. 5, but showing the take-out plates in an advanced condition;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
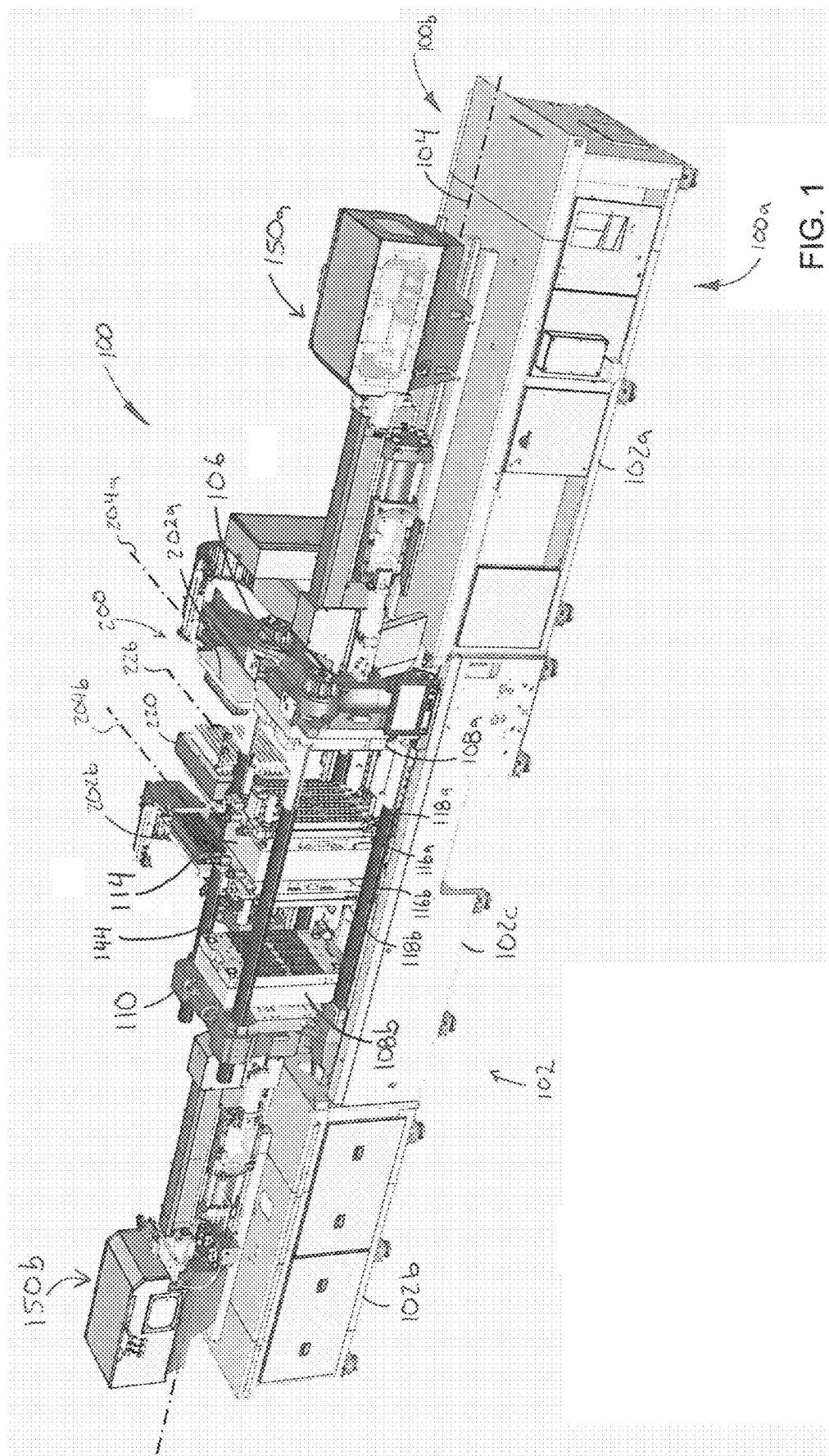
FIG. 1 is a perspective view, taken from the operator side, of an example injection molding machine.

Referring to FIG. 1, an example of an injection molding machine 100 is shown set up for molding preforms that can be used as input material for subsequent processing, for example, a blow molding operation to produce beverage containers. In the example illustrated, the machine 100 includes a machine base 102 extending lengthwise along a generally horizontal machine axis 104. The base 102 includes a first injection unit support portion 102a, a second injection unit support portion 102b spaced axially apart from the first injection unit support portion 102a, and a platen support portion 102c axially intermediate the first and second injection unit support portions 102a, 102b.

In the example illustrated, a stationary platen 106 is fixed to the platen support portion 102c and supports a first cavity mold half 108a. A moving platen 110 is supported by the platen support portion 102c and is spaced axially apart from the stationary platen 106. The moving platen 110 supports a second cavity mold half 108b. A center section 114 is supported by the platen support portion 102c axially intermediate the stationary and moving platens 106, 110. The center section 114 has a center section first face 116a directed toward the stationary platen 106 and supporting a first core mold half 118a, and a center section second face 116b opposite the center section first face 116a and directed toward the moving platen 110. The center section second face 116b supports a second core mold half 118b.

Figure 2A:
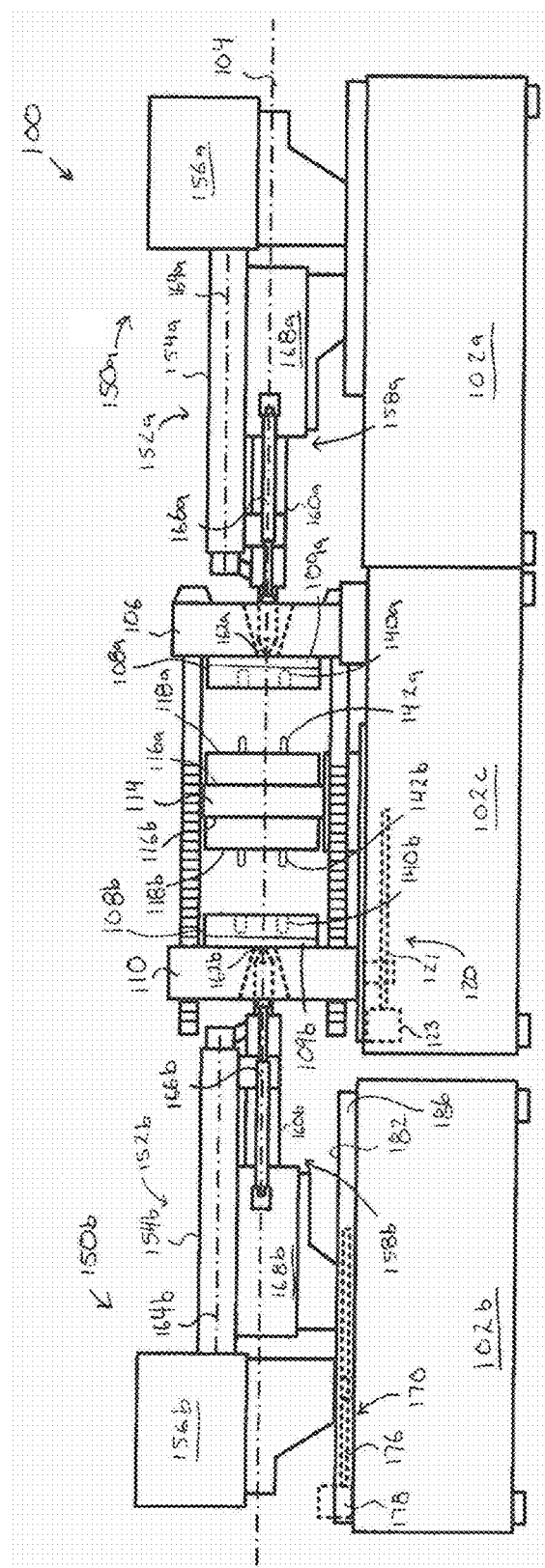
FIG. 2A is a schematic elevation view, taken from the operator side, of the machine of FIG. 1 shown in a mold-open condition.
Figure 2B:
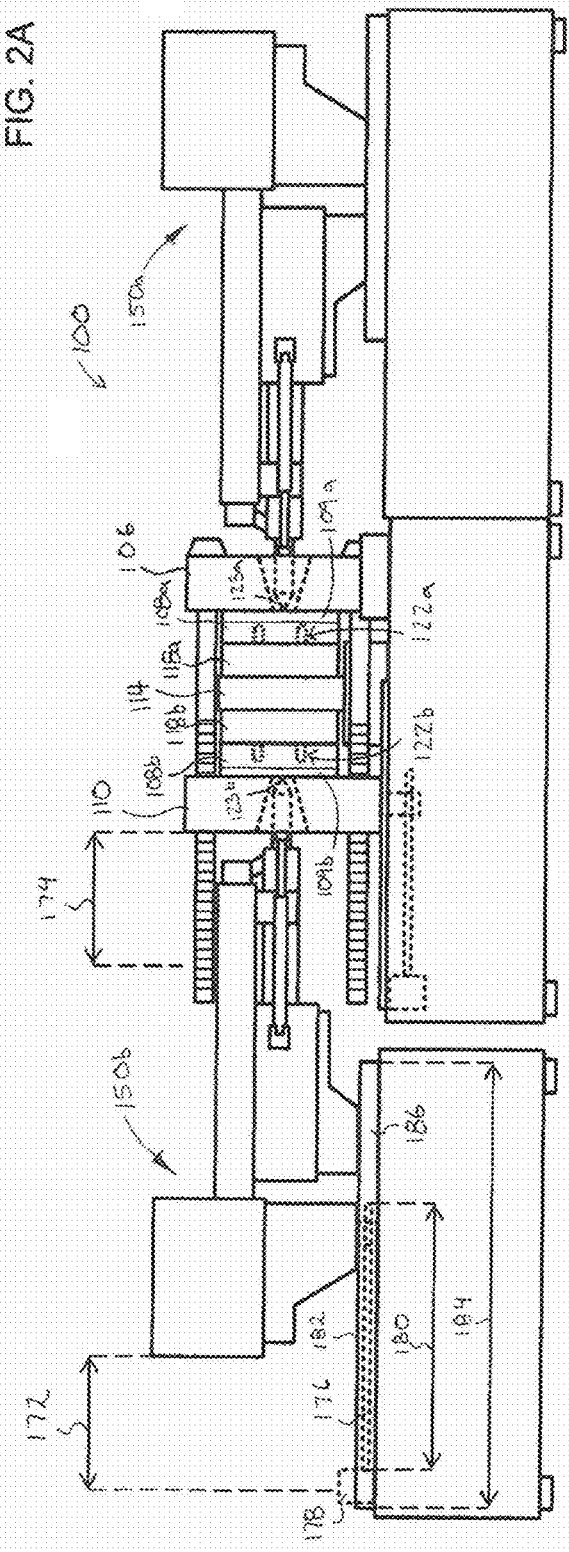
FIG. 2B is a schematic elevation view like that of FIG. 2A, but with the machine shown in a mold-closed condition.

Referring to FIG. 2A, in the example illustrated, the machine 100 includes at least one mold stroke actuator 120 for translating the moving platen 110 and the center section 114 along the machine axis 104 between a mold-open position (FIG. 2A) and a mold-closed position (FIG. 2B). In the example illustrated, the mold stroke actuator 120 includes at least one mold stroke driving mechanism for urging translation of the moving platen 110 and the center section 114. In the example illustrated, the mold stroke actuator 120 includes a pair of laterally spaced apart mold stroke driving mechanisms. In the example illustrated, each mold stroke driving mechanism includes a mold stroke ball screw 121 mounted to the platen support portion 102c and driven by a mold stroke drive 123.

In the example illustrated, when the moving platen 110 and the center section 114 are in the mold-open position, the first cavity mold half 108a is spaced axially apart from the first core mold half 118a and the second cavity mold half 108b is spaced axially apart from the second core mold half 118b. Referring to FIG. 2B, when the moving platen 110 and the center section 114 are in the mold-closed position, the first cavity mold half 108a is in engagement with the first core mold half 118a to define a set of first mold cavities 122a for forming a set of molded first preforms 124a (e.g. molded preform 124 shown in FIG. 3), and the second cavity mold half 108b is in engagement with the second core mold half 118b to define a set of second mold cavities 122b for forming a set of molded second preforms 124b (e.g. molded preform 124 shown in FIG. 3). In the example illustrated, the mold includes 96 first mold cavities 122a and 96 second mold cavities 122b, for a total cavitation of 192.

Referring to FIG. 3, an example of a molded preform 124 is shown. The first and second preforms 124a, 124b can be generally similar to the molded preform 124, and like references characters are used to identify like features. In the example illustrated, the first preforms 124a and the second preforms 124b are the same. In some examples, the first preforms 124a can have a shape different from that of the second preforms 124b.

In the example illustrated, the preform 124 has a generally elongate tubular body 126 extending along a preform axis 128 between an open end 130a and an opposed closed end 130b of the preform 124. A threaded portion 132 for receiving a closure is provided adjacent the open end 130a. A radially outwardly extending annular flange 134 is adjacent the threaded portion 132, with the threaded portion 132 axially intermediate the open end 130a and the flange 134. The preform 124 has an inner surface 136. The inner surface 136 includes a generally cylindrical inner wall portion 136a extending along the axial extent of the preform 124 (between the open and closed ends 130a, 130b), and a generally concave inner end portion 136b at the closed end 130b. The preform 124 has an outer surface 138 spaced apart from the inner surface 136. The outer surface 138 includes a generally cylindrical outer wall portion 138a extending along the axial extent of the preform 124 and a convex outer end portion 138b at the closed end 130b. The spacing between the inner and outer surfaces 136, 138 generally defines a preform wall thickness 139.

Referring to FIG. 2A, in the example illustrated, the first cavity mold half 108a includes a set of first recesses 140a for forming the outer surface 138 of the first preforms 124a. The first core mold half 118a includes a set of first mold core pins 142a for insertion into the first recesses 140a to form the inner surface 136 of the first preforms 124a. The second cavity mold half 108b includes a set of second recesses 140b for forming the outer surface 138 of the second preforms 124b. The second core mold half 118b includes a set of second mold core pins 142b for insertion into the second recesses 140b to form the inner surface 136 of the second preforms 124b.

Referring to FIG. 1, a plurality of tie bars 144 extend parallel to the machine axis 104 between the stationary and moving platens 106, 110. The moving platen 110 can be releasably locked to the tie bars 144 for exerting a clamp load across the mold halves 108a, 118a, 108b, 118b when the moving platen 110 and the center section 114 are in the mold-closed position (FIG. 2B).

Referring to FIG. 2A, the machine 100 includes a first injection unit 150a supported by the first injection unit support portion 102a behind (i.e. axially outboard of) the stationary platen 106 for injecting a first melt into the first mold cavities 122a through the stationary platen 106. A second injection unit 150b is supported by the second injection unit support portion 102b behind (i.e. axially outboard of) the moving platen 110 for injecting a second melt into the second mold cavities 122b through the moving platen 110. The second injection unit 150b is translatable along the machine axis 104 to accommodate translation of the moving platen 110 during movement between the mold-open and mold-closed positions.

In the example illustrated, the first injection unit 150a comprises a two-stage injection unit having a first plasticizing apparatus 152a for plasticizing a first resin (also referred to as "first melt"). The first plasticizing apparatus 152a includes a first plasticizing screw housed within a first plasticizing barrel 154a. The first plasticizing screw is rotationally driven by a first rotary drive housed within a first drive housing 156a.

In the example illustrated, the first injection unit 150a further includes a first plunger apparatus 158a having a first shooting pot 160a for receiving the first resin from the first plasticizing apparatus 152a. The first plunger apparatus 158a can force the first resin from the first shooting pot 160a and through a first injection unit nozzle 162a of the first injection unit 150a, to inject the first resin into the first mold cavities 122a through a first hot runner 109a of the first cavity mold half 108a. In the example illustrated, the first plunger apparatus 158a is transversely offset from the first plasticizing apparatus 152a. In the example illustrated, the first plunger apparatus 158a is below the first plasticizing apparatus 152a.

In the example illustrated, the first injection unit nozzle 162a is generally centered about the machine axis 104. In the example illustrated, the first shooting pot 160a is generally centered about the machine axis 104.

In the example illustrated, the first plasticizing barrel 154a extends along a first barrel axis 164a. In the example illustrated, the first barrel axis 164a is spaced vertically above the machine axis 104. In the example illustrated the first barrel axis 164a is generally parallel to the machine axis 104.

In the example illustrated, the machine 100 includes a first sprue engagement actuator 166a coupled to the first injection unit 150a for holding the first injection nozzle 162a in engagement with a first sprue 123a (FIG. 2B) of the first cavity mold half 108a during injection of the first resin into the first mold cavities 122a. In the example illustrated, the first sprue engagement actuator 166a comprises at least one hydraulic cylinder connected at one end to the stationary platen 106 and at an opposite end to a first plunger apparatus housing 168a of the first plunger apparatus 158a.

In the example illustrated, the second injection unit 150b comprises a two-stage injection unit like that of the first injection unit 150a, and like features are identified using like reference characters with a "b" suffix.

In the example illustrated, the first and second injection units 150a, 150b are generally interchangeable. In the example illustrated, the first and second injection units have generally the same physical size. In the example illustrated, the first and second injection units 150a, 150b have generally the same engagement with the stationary and moving platens 106, 110, respectively. In the example illustrated, the first injection unit 150a is mountable on either of the first injection unit support portion 102a to inject resin through the stationary platen 106 and the second injection unit support portion 102b to inject resin through the moving platen 110, and the second injection unit 150b is mountable on either of the first injection unit support portion 102a to inject resin through the stationary platen 106 and the second injection unit support portion 102b to inject resin through the moving platen 110.

In the example illustrated, the second injection unit 150b includes a second plasticizing apparatus 152b for plasticizing a second resin (also referred to as "second melt"). The second plasticizing apparatus 152b includes a second plasticizing screw housed within a second plasticizing barrel 154b. The second plasticizing screw is rotationally driven by a second rotary drive housed within a second drive housing 156b.

In the example illustrated, the second injection unit 150b further includes a second plunger apparatus 158b having a second shooting pot 160b for receiving the second resin from the second plasticizing apparatus 152b. The second plunger apparatus 158b can force the second resin from the second shooting pot 160b and through a second injection unit nozzle 162b of the second injection unit 150b, to inject the second resin into the second mold cavities 122b through a second hot runner 109b of the second cavity mold half 108b. In the example illustrated, the second plunger apparatus 158b is transversely offset from the second plasticizing apparatus 152b. In the example illustrated, the second plunger apparatus 158b is below the second plasticizing apparatus 152b.

In the example illustrated, the second injection unit nozzle 162b is generally centered about the machine axis 104. In the example illustrated, the second shooting pot 160b is generally centered about the machine axis 104. In the example illustrated, the first and second shooting pots 160a, 160b are generally collinear.

In the example illustrated, the second plasticizing barrel 154b extends along a second barrel axis 164b. In the example illustrated, the second barrel axis 164b is spaced vertically above the machine axis 104. In the example illustrated the second barrel axis 164b is generally parallel to the machine axis 104. In the example illustrated, the first and second plasticizing barrels 154a, 154b are at a generally common elevation. In the example illustrated, the first and second barrel axes 164a, 164b are generally collinear.

In the example illustrated, the machine 100 includes a second sprue engagement actuator 166b coupled to the second injection unit 150b for holding the second injection nozzle 162b in engagement with a second sprue 123b (FIG. 2B) of the second cavity mold half 108b during injection of the second resin into the second mold cavities 122b. In the example illustrated, the second sprue engagement actuator 166b comprises a hydraulic cylinder connected at one end to the moving platen 110 and at an opposite end to a second plunger apparatus housing 168b of the second plunger apparatus 158b. In the example illustrated, the second injection unit 150b is held in fixed position relative to the moving platen 110 to bear against and translate with the moving platen 110 during normal machine operation (i.e. during injection and translation of the moving platen 110 and the center section 114 between the mold-open and mold-closed positions).

In the example illustrated, the machine 100 includes an injection unit stroke actuator 170 coupled to the second injection unit 150b for urging translation of the second injection unit 150b along the machine axis 104. Referring to FIG. 2B, in the example illustrated, the injection unit stroke actuator 170 is operable to urge translation of the second injection unit 150b over at least an injection unit stroke length 172. The injection unit stroke length 172 is equal to a mold stroke length 174 that the moving platen 110 traverses axially when moving between the mold-open and mold-closed positions.

In the example illustrated, the mold stroke actuator 120 provides at least a portion of a mold stroke force required to translate the moving platen 110 and the center section 114 between the mold-open and mold-closed positions, and the injection unit stroke actuator 170 provides at least a portion of an injection unit stroke force required to translate the second injection unit 150b over the injection unit stroke length 172. A sum of the mold stroke force and the injection unit stroke force (i.e., a total force required to move the moving platen 110 and the center section 114 between the mold-open and mold-closed positions, and the second injection unit 150b over the injection unit stroke length 172) is provided by a combination of the mold stroke actuator 120 and the injection unit stroke actuator 170. Providing a second injection unit actuator separate from the mold stroke actuator 120 can help reduce the load on the mold stroke actuator 120, and may also help reduce stress loads exerted on the moving platen 110 during movement between the mold-open and mold-closed positions.

In the example illustrated, the injection unit stroke actuator 170 includes at least one injection unit driving mechanism for urging translation of the second injection unit 150b over the injection unit stroke length 172. In the example illustrated, the second injection unit actuator 170 includes a single injection unit driving mechanism. In the example illustrated, the injection unit driving mechanism comprises an injection unit ball screw 176 mounted to the second injection unit support portion 102b and driven by an injection unit stroke drive 178. The injection unit ball screw 176 extends parallel to the machine axis 104 over a ball screw length 180. The ball screw length 180 is at least equal to the mold stroke length 174. In the example illustrated, the ball screw length 180 is greater than the mold stroke length 174.

In some examples, each of the mold stroke driving mechanisms and the injection unit driving mechanisms are identical to each other.

In some examples, the injection unit driving mechanism can comprise a hydraulic cylinder mounted to the second injection unit support portion 102b.

Referring to FIG. 2B, in the example illustrated, the second injection unit 150b is slidably supported on a slide surface 182 mounted atop the second injection unit support portion 102b for facilitating translation of the second injection unit 150b over the injection unit stroke length 172. In the example illustrated, the slide surface 182 extends parallel to the machine axis 104 over a slide surface length 184. The slide surface length 184 is at least equal to the mold stroke length 174. In the example illustrated, the slide surface length 184 is greater than the mold stroke length 174. In the example illustrated, the slide surface 182 comprises a pair of laterally spaced apart linear rails 186 extending parallel to the machine axis 104.

In the example illustrated, the injection unit ball screw 176 is mounted laterally intermediate the linear rails 186. In the example illustrated, the injection unit ball screw 176 is mounted atop the second injection unit support portion 102b. In the example illustrated, the injection unit ball screw 176 is mounted generally below the second injection unit 150b. In the example illustrated, the injection unit ball screw 176 axially overlaps the second drive housing 156b of the second injection unit 150b.

Referring to FIG. 1, in the example illustrated, the machine 100 includes a part-handling apparatus 200 for interacting with the first and second preforms 124a, 124b. The part-handling apparatus 200 may be used to, for example, unload, transfer, and/or cool the preforms 124a, 124b. In the example illustrated, the machine 100 has an operator side 100a and a non-operator side 100b laterally opposite the operator side 100a. In the example illustrated, the part-handling apparatus 200 is on the non-operator side 100b of the machine 100.

Figure 4:
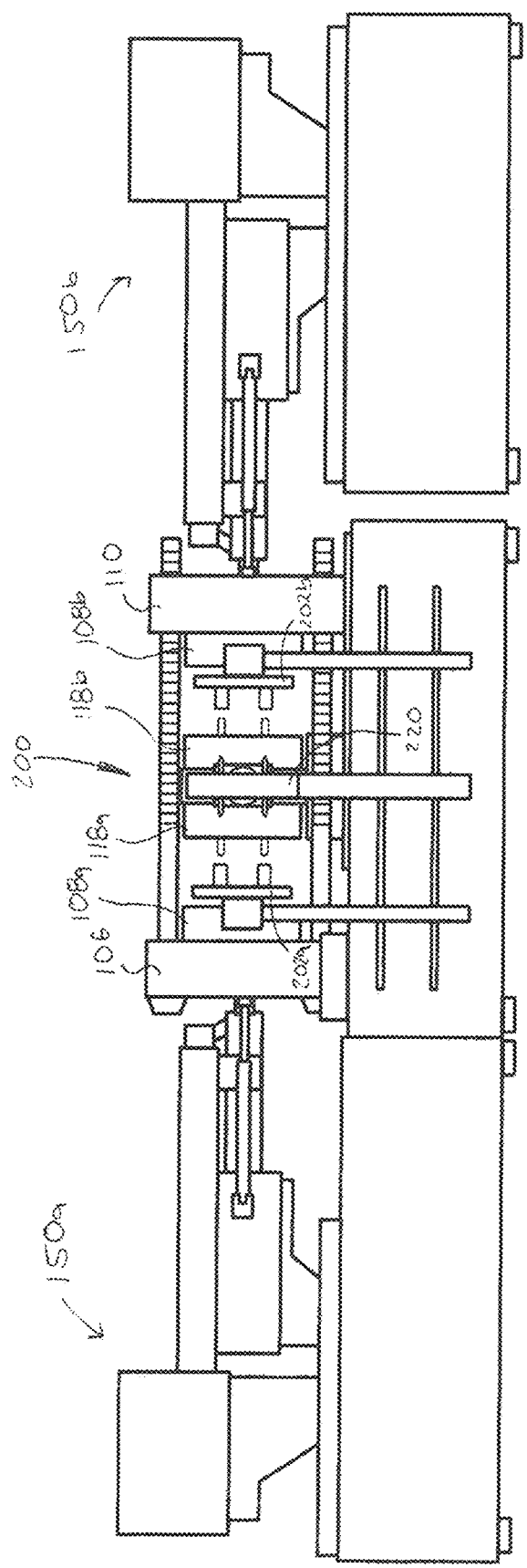
FIG. 4 is a schematic elevation view, taken from the non-operator side, of the machine of FIG. 1 shown in the mold-open condition.

Referring to FIG. 4, in the example illustrated, the part-handling apparatus 200 includes a first take-out plate 202a supported by the base 102 on the non-operator side 100b of the machine 100, and a second take-out plate 202b supported by the base 102 on the non-operator side 100b of the machine 100 and spaced axially apart from the first take-out plate 202a.

Referring to FIGS. 5 and 6, the first take-out plate 202a is moveable relative to the base 102 between a first retracted position (FIG. 5) and at least one first advanced position (FIG. 6) when the moving platen 110 and the center section 114 are in the mold-open position. When in the first advanced position, the first take-out plate 202a reaches between the first cavity mold half 108a and the first core mold half 118a to facilitate transfer of the first preforms 124a from the first core mold half 118a to retained engagement on the first take-out plate 202a. When in the first retracted position, the first take-out plate is clear of the first cavity mold half 108a and the first core mold half 118a.

In the example illustrated, the second take-out plate 202b is moveable relative to the base 102 between a second retracted position (FIG. 5) and at least one second advanced position (FIG. 6) when the moving platen 110 and the center section 114 are in the mold-open position. When in the second advanced position, the second take-out plate 202b reaches between the second cavity mold half 108b and the second core mold half 118b to facilitate transfer of the second preforms 124b from the second core mold half 118b to retained engagement on the second take-out plate 202b. When in the second retracted position, the second take-out plate 202b is clear of the second cavity mold half 108b and the second core mold half 118b.

In the example illustrated, the first take-out plate 202a translates along a horizontal first take-out plate axis 204a between the first advanced and retracted positions, and the second take-out plate 202b translates along a horizontal second take-out plate axis 204b between the second advanced and retracted positions. In the example illustrated, the first and second take-out plate axes 204a, 204b are perpendicular to the machine axis 104.

Optionally, when in the first advanced position, the first take-out plate 202a can be translatable parallel to the machine axis 104 toward the first core mold half 118a to facilitate transfer of the first preforms 124a to the first take-out plate 202a. Optionally, when in the second advanced position, the second take-out plate 202b can be translatable parallel to the machine axis 104 toward the second core mold half 118b to facilitate transfer of the second preforms 124b to the second take-out plate 202b.

Referring to FIG. 6, the center section 114 can optionally include an ejection mechanism 210 (shown schematically in FIGS. 6 and 7) to facilitate transfer of the first and second preforms 124a, 124b from the first and second core mold halves 118a, 118b to retained engagement on the first and second take-out plates 202a, 202b when the first and second take-out plates 202a, 202b are in the first and second advanced positions, respectively.

Figure 7:
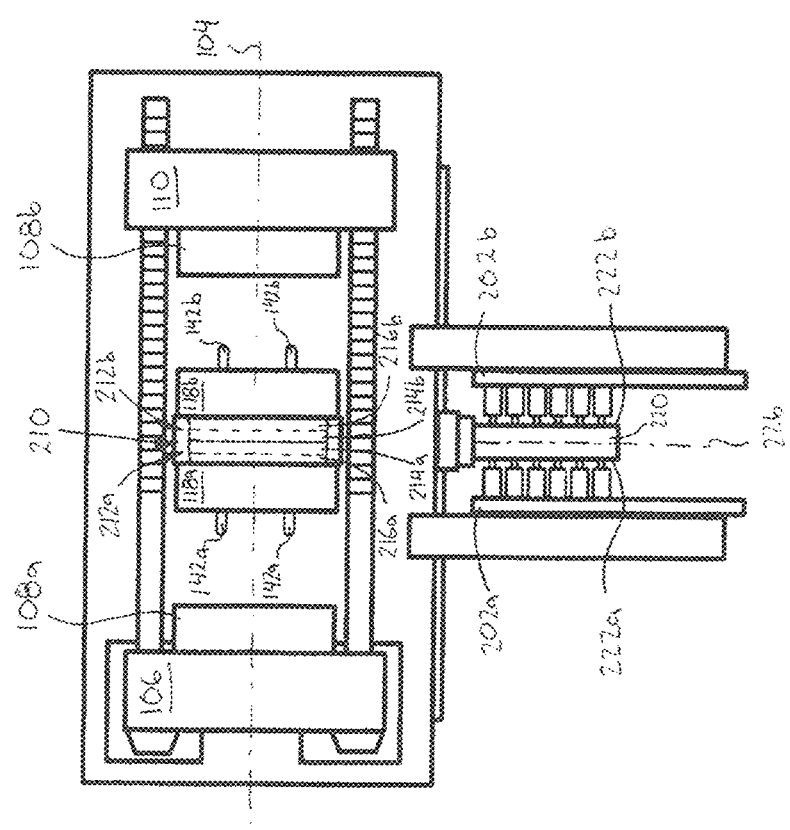
FIG. 7 is a schematic top view like that of FIG. 5, but showing the take out plates in a shell-engagement condition.

Referring to FIG. 7, in the example illustrated, the ejection mechanism 210 includes a first ejector apparatus 212*a* to help eject the first preforms 124*a* from the first core mold half 118*a* and into retained engagement on the first take-out plate 202*a*. The first ejector apparatus 212*a* includes a first boost actuator 214*a* for breaking the first preforms 124*a* from engagement with the first mold core pins 142*a*, and a first escape actuator 216*a* for pushing the first preforms 124*a* further toward the first take-out plate 202*a* to facilitate transfer of the first preforms 124*a* to retained engagement on the first take-out plate 202*a*. In the example illustrated, the first boost actuator 214*a* comprises a high-force, short-stroke actuator, and the first escape actuator 216*a* comprises a low-force, long-stroke actuator.

In the example illustrated, the ejection mechanism 210 further includes a second ejector apparatus 212*b* to help eject the second preforms 124*b* from the second core mold half 118*b* and into retained engagement on the second take-out plate 202*b*. The second ejector apparatus 212*b* includes a second boost actuator 214*b* for breaking the second preforms 124*b* from engagement with the second mold core pins 142*b*, and a second escape actuator 216*b* for pushing the second preforms 124*b* further toward the second take-out plate 202*b* to facilitate transfer of the second preforms 124*a* to retained engagement on the second take-out plate 202*a*. In the example illustrated, the second boost actuator 214*b* comprises a high-force, short-stroke actuator, and the second escape actuator 216*b* comprises a low-force, long-stroke actuator.

Referring to FIG. 6, in the example illustrated, the first take-out plate 202*a* includes at least one set of first cooling tubes 206*a* for retaining and cooling the first preforms 124*a*. The first take-out plate 202*a* further includes at least one first internal fluid conduit 208*a* for conducting coolant to and from the first cooling tubes 206*a* to facilitate cooling of the outer surface 138 of first preforms 124*a* retained in the first cooling tubes 206*a*. The second take-out plate includes at least one set of second cooling tubes 206*b* for retaining and cooling the second preforms 124*b*. The second take-out plate 202*b* further includes at least one second internal fluid conduit 208*b* for conducting coolant to and from the second cooling tubes 206*b* to facilitate cooling of the outer surface 138 of second preforms 124*b* retained in the second cooling tubes 206*b*.

In the example illustrated, the part-handling apparatus 200 further includes a transfer shell 220 supported by the base 102 on the non-operator side 100*b* of the machine 100. The transfer shell 220 is axially intermediate the first and second take-out plates 202*a*, 202*b*. The transfer shell 220 includes a shell first face 222*a* having a set of first transfer pins 224*a* protruding therefrom for retaining the first preforms 124*a*, and a shell second face 222*b* opposite the shell first face 222*a*. The shell second face 222*b* has a set of second transfer pins 224*b* protruding therefrom for retaining the second preforms 124*b*. In the example illustrated, the quantity of first transfer pins 224*a* is equal to the quantity of first cooling tubes 206*a*, and the quantity of second transfer pins 224*b* is equal to the quantity of second cooling tubes 206*b*. In the example illustrated, the transfer shell 220 includes at least one internal header in communication with a suction source for drawing ambient air through the first and second transfer pins 224*a*, 224*b* to facilitate cooling, transfer, and/or retention of the first and second preforms 124*a*, 124*b*.

Referring to FIG. 7, in the example illustrated, the first take-out plate 202*a* is movable along the first take-out plate axis 204*a* to one retracted position in which the first cooling tubes 206*a* are each aligned with respective ones of the first transfer pins 224*a*. In the example illustrated, the second take-out plate 202*b* is movable along the second take-out plate axis 204*b* to one second retracted position in which the second cooling tubes 206*b* are each aligned with respective ones of the second transfer pins 224*b*.

In the example illustrated, when in the first retracted position, the first take-out plate 202*a* is translatable parallel to the machine axis 104 toward the transfer shell 220 to a first shell-transfer position to facilitate transfer of at least one set of the first preforms 124*a* from the first take-out plate 202*a* to retained engagement on the first transfer pins 224*a*. When in the second retracted position, the second take-out plate 202*b* is translatable parallel to the machine axis 104 toward the transfer shell 220 to a second shell-transfer position to facilitate transfer of at least one set of the second preforms 124*b* from the second take-out plate 202*b* to retained engagement on the second transfer pins 224*b*.

Figure 8:
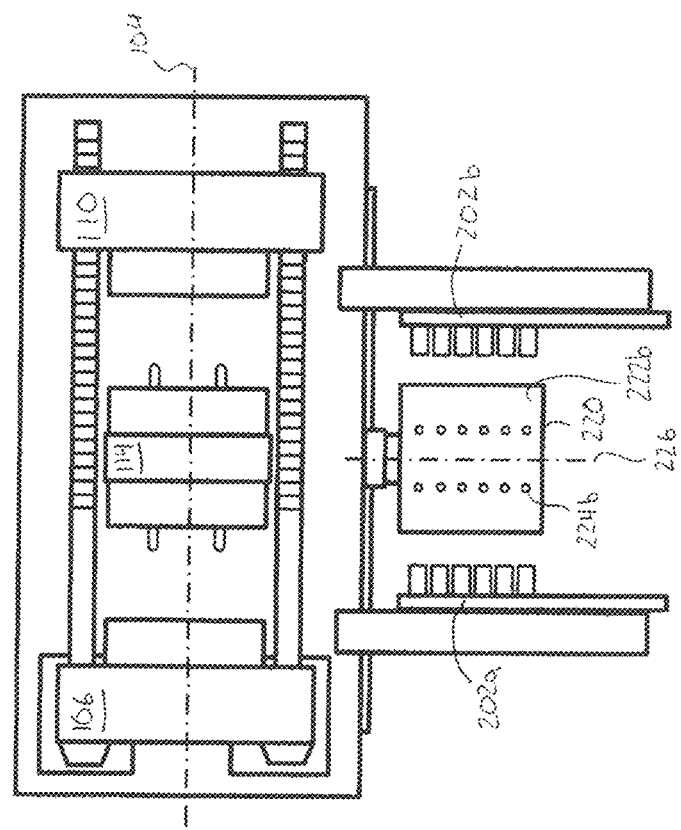
FIG. 8 is a schematic top view like that of FIG. 5, but showing the transfer shell in a first unload condition.
Figure 9:
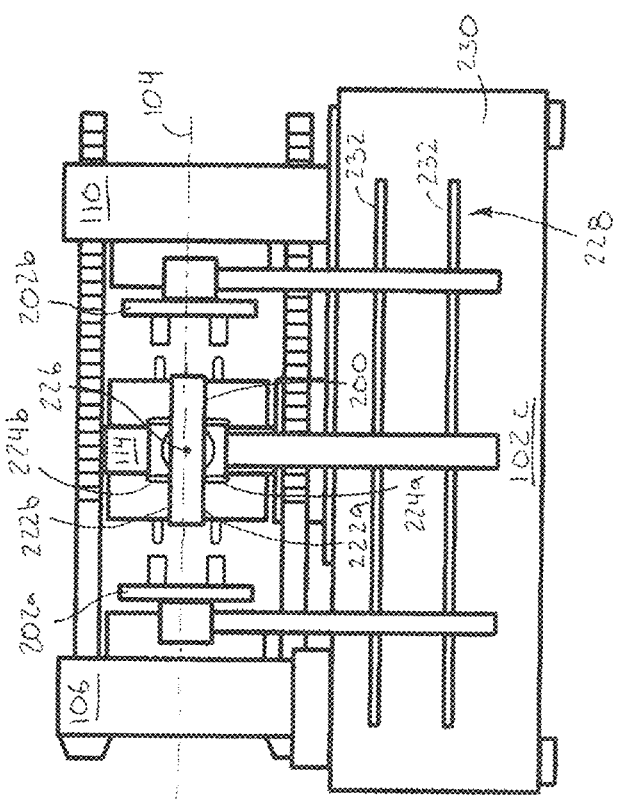
FIG. 9 is a schematic elevation view, taken from the non-operator side, of the structure of FIG. 8.

Referring to FIGS. 7 and 8, in the example illustrated, the transfer shell 220 is rotatable about a horizontal shell axis 226 generally perpendicular to the machine axis 104. The transfer shell 220 is rotatable among a load position (FIG. 7), a first unload position (FIGS. 8 and 9), and a second unload position. Referring to FIG. 7, when the transfer shell 220 is in the load position, the shell first face 222*a* is directed axially toward the first take-out plate 202*a* and the shell second face 222*b* is directed axially toward the second take-out plate 202*b* for facilitating transfer of the preforms 124*a*, 124*b* from the first and second take-out plates 202*a*, 202*b* to the transfer shell 220. Referring to FIGS. 8 and 9, when the transfer shell 220 is in the first unload position, the shell first face 222*a* is directed downwardly for releasing the first preforms 124*a* from the transfer shell 220. When the transfer shell 220 is in the second unload position, the shell second face 222*b* is directed downwardly for releasing the second preforms 124*b* from the transfer shell 220.

Referring to FIG. 9, one or more structures of the part-handling apparatus 200 can be supported on a rail assembly 228 fixed to a sidewall 230 of the platen support portion 102*c* on the non-operator side 100*b*. In the example illustrated, the first take-out plate 202*a* is supported on the rail assembly 228. In the example illustrated, the second take-out plate 202*b* is also supported on the rail assembly 228. In the example illustrated, the transfer shell 220 is also supported on the rail assembly 228. In the example illustrated, the rail assembly 228 includes a pair of vertically spaced apart linear rails 232 fixed to the sidewall 230 and extending parallel to the machine axis 104. In the example illustrated, the first and second take-out plates 202*a*, 202*b* are each slidably supported by the rail assembly 228 for facilitating translation of the first and second take-out plates 202*a*, 202*b* parallel to the machine axis 104.

Figure 10:
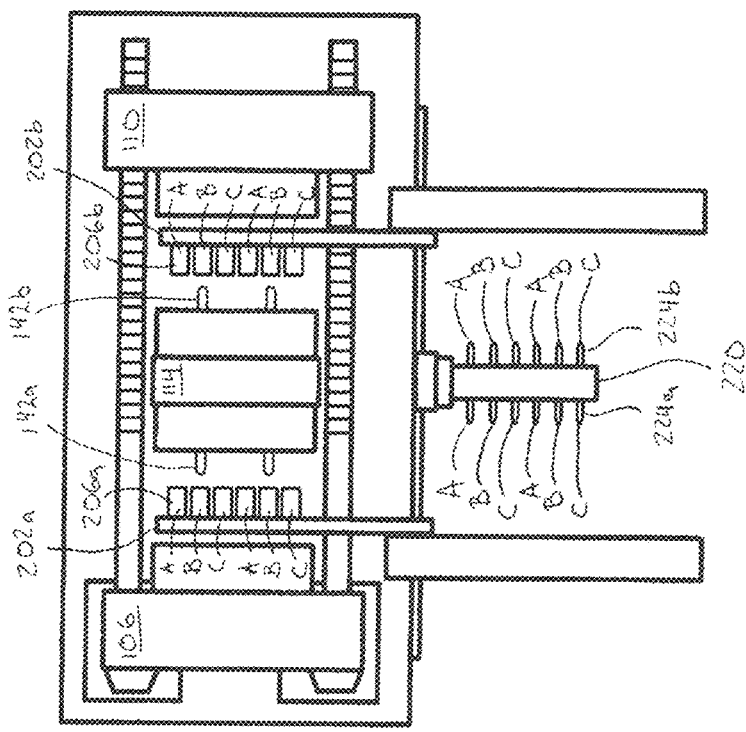
FIG. 10 is a schematic top view like that of FIG. 5, but showing the take-out plates in another advanced condition.

Referring to FIG. 10, in the example illustrated, the quantity of the first cooling tubes 206*a* is greater than the quantity of the first mold cavities 122*a*. In the example illustrated, the first take-out plate 202*a* includes a set of set-A first cooling tubes 206*a* and a set of set-B first cooling tubes 206*a*. In the example illustrated, the first take-out plate 202*a* further includes a set of set-C first cooling tubes 206*a*. In the example illustrated, the set-A first cooling tubes 206*a*, the set-B first cooling tubes 206*a*, and the set-C first cooling tubes 206*a* are offset from each other along the first take-out plate axis 204*a*. In the example illustrated, each set of first cooling tubes 206*a* includes 96 cooling tubes, for a total of 288 first cooling tubes 206*a*.

In the example illustrated, the first take-out plate 202*a* is translatable to a set-A first advanced position (FIG. 6) for aligning the set-A first cooling tubes 206a with the first mold core pins 142a to facilitate transfer of the first preforms 124a to retained engagement in the set-A first cooling tubes 206a, and a set-B first advanced position (FIG. 10) for aligning the set-B first cooling tubes 206a with the first mold core pins 142a to facilitate transfer of the first preforms 124a to retained engagement in the set-B first cooling tubes 206a. In the example illustrated, the first take-out plate 202a is further translatable to a set-C first advanced position (not shown) for aligning the set-C first cooling tubes 206a with the first mold core pins 124a to facilitate transfer of the first preforms 124a to retained engagement in the set-C first cooling tubes 206a. In the example illustrated, the set-A first advanced position, the set-B first advanced position, and the set-C first advanced position are offset from each other along the first take-out plate axis 204a.

In the example illustrated, the quantity of the second cooling tubes 206b is greater than the quantity of the second mold cavities 122b. In the example illustrated, the second take-out plate 202b includes a set of set-A second cooling tubes 206b and a set of set-B second cooling tubes 206b. In the example illustrated, the second take-out plate 202b further includes a set of set-C second cooling tubes 206b. The set-A second cooling tubes 206b, the set-B second cooling tubes 206b, and the set-C second cooling tubes 206b are offset from each other along the second take-out plate axis 204b. In the example illustrated, each set of second cooling tubes 206b includes 96 cooling tubes, for a total of 288 second cooling tubes 206b.

In the example illustrated, the second take-out plate 202b is translatable to a set-A second advanced position (FIG. 6) for aligning the set-A second cooling tubes 206b with the second mold core pins 142b to facilitate transfer of the second preforms 124b to retained engagement in the set-A second cooling tubes 206b, and a set-B second advanced position (FIG. 10) for aligning the set-B second cooling tubes 206b with the second mold core pins 142b to facilitate transfer of the second preforms 124b to retained engagement in the set-B second cooling tubes 206b. In the example illustrated, the second take-out plate 202b is further translatable to a set-C second advanced position (not shown) for aligning the set-C second cooling tubes 206b with the second mold core pins 142b to facilitate transfer of the second preforms 124b to retained engagement in the set-C second cooling tubes 206b. In the example illustrated, the set-A second advanced position, the set-B second advanced position, and the set-C second advanced position are offset from each other along the second take-out plate axis 204b.

In the example illustrated, the transfer shell 220 has three sets of first transfer pins 224a—set-A first transfer pins 224a, set-B first transfer pins 224a, and set-C first transfer pins 224a. When the first take-out plate 202a is in the first retracted position, the set-A, set-B, and set-C first cooling tubes 206a are aligned with the set-A, set-B, and set-C first transfer pins 224a, respectively. In the example illustrated, the transfer shell 220 has three sets of second transfer pins 224b—set-A second transfer pins 224b, set-B second transfer pins 224b, and set-C second transfer pins 224b. When the second take-out plate 202b is in the second retracted position, the set-A, set-B, and set-C second cooling tubes 206b are aligned with the set-A, set-B, and set-C second transfer pins 224b, respectively.

In use, the first plasticizing apparatus 152a plasticizes the first resin and the second plasticizing apparatus 152b plasticizes the second resin. Once plasticized, the first resin is received in the first shooting pot 160a and the second resin is received in the second shooting pot 160b. When sufficient clamp load has been applied across the mold, the first resin is forced from the first shooting pot 160a through the stationary platen 106 and into the first mold cavities 122a to form a set of set-A first preforms 124a, and the second resin is forced from the second shooting pot 160b through the moving platen 110 and into the second mold cavities 122b to form a set of set-A second preforms 124b.

Once injection is complete, the clamp force can be relieved. The mold stroke actuator 120 is energized to provide at least a portion of a mold stroke force required to translate the moving platen 110 and the center section 114 away from the stationary platen 106 to open the mold, and the injection unit stroke actuator 170 is energized to provide at least a portion of an injection unit stroke force required to translate the second injection unit 150b away from the stationary platen 106 to accommodate translation of the moving platen 110. In the example illustrated, the mold stroke actuator 120 and the injection unit stroke actuator 170 operate in unison to translate the moving platen 110 and the second injection unit 150b synchronously. The force required to move the moving platen 110 and the second injection unit 150b synchronously is provided by a combination of the mold stroke actuator 120 and the injection unit stroke actuator 170.

After the mold is opened, the first take-out plate 202a is translated to the set-A first advanced position and the second take-out plate 202b is translated to the set-A second advanced position.

When the first take-out plate 202a is in the set-A first advanced position, the set-A first preforms 124a are released from the first core mold half 118a and transferred to retained engagement in the set-A first cooling tubes 206a. In particular, the first boost actuator 214a breaks the first preforms 124a from engagement with the first mold core pins 142a, and the first escape actuator 216a pushes the first preforms 124a further toward the first take-out plate 202a to help transfer the first preforms 124a to retained engagement in the set-A first cooling tubes 206a.

When the second take-out plate 202b is in the set-A second advanced position, the set-A second preforms 124b are released from the second core mold half 118b and transferred to retained engagement in the set-A second cooling tubes 206b. In particular, the second boost actuator 214b breaks the second preforms 124b from engagement with the second mold core pins 142b, and the second escape actuator 216b pushes the second preforms 124b further toward the second take-out plate 202b to help transfer the second preforms 124b to retained engagement in the set-A second cooling tubes 206b.

After receiving the set-A first and second preforms 124a, 124b, the first and second take-out plates 202a, 202b are translated to the first and second retracted positions, respectively.

After reaching the first and second retracted positions, the first and second take-out plates 202a, 202b are translated parallel to the machine axis 104 toward the transfer shell 220 to the first and second shell-transfer positions, respectively.

In the example illustrated, the first take-out plate 202a has three sets of first cooling tubes 206a, and the set-A first preforms 124a remain in the set-A first cooling tubes 206a until the set-B and set-C first cooling tubes 206a are loaded with respective sets of first preforms 124a. When the first take-out plate 202a is in the first shell-transfer position, ambient air is drawn through the first transfer pins 224a to facilitate cooling of inner surfaces of the set-A first preforms 124a. The first take-out plate 202a disengages the transfer shell 220 by moving parallel to the machine axis 104 back to the first retracted position, carrying the set-A first preforms 124*a* with it, before translating to the set-B and set-C first advanced positions at the appropriate points in the next two cycles.

The second take-out plate 202*b* has three sets of second cooling tubes 206*b*, and the set-A second preforms 124*b* remain in the set-A second cooling tubes 206*b* until the set-B and set-C second cooling tubes 206*b* are loaded with respective sets of second preforms 124*b*. When the second take-out plate 202*b* is in the second shell-transfer position, ambient air is drawn through the second transfer pins 224*b* to facilitate cooling of inner surfaces of the set-A second preforms 124*b*. The second take-out plate 202*b* disengages the transfer shell 220 by moving parallel to the machine axis 104 back to the second retracted position, carrying the set-A second preforms 124*b* with it, before translating to the set-B and set-C second advanced positions at the appropriate points in the next two cycles.

After the set-B and set-C first cooling tubes 206*a* are loaded, the first take-out plate 202*a* again moves to the first shell-transfer position. Prior to disengagement from the transfer shell 220, the set-A first preforms 124*a* are released from the set-A first cooling tubes 206*a* and transferred to retained engagement on the set-A first transfer pins 224*a*. The first take-out plate 202*a* then disengages the transfer shell 220, with the set-A first cooling tubes 206*a* empty and ready to receive the next set of first preforms 124*a* from the first core mold half 118*a*.

After the set-B and set-C second cooling tubes 206*b* are loaded, the second take-out plate 202*b* again moves to the second shell-transfer position. Prior to disengagement from the transfer shell 220, the set-A second preforms 124*b* are released from the set-A second cooling tubes 206*b* and transferred to retained engagement on the set-A second transfer pins 224*b*. The second take-out plate 202*b* then disengages the transfer shell 220, with the set-A second cooling tubes 206*b* empty and ready to receive the next set of second preforms 124*b* from the second core mold half 118*b*.

What is claimed is:

1. An injection molding machine for molding preforms, comprising:
   a) a machine base extending along a horizontal machine axis;
   b) a stationary platen fixed to the base for supporting a first cavity mold half;
   c) a moving platen supported by the base and translatable along the machine axis towards and away from the stationary platen, the moving platen for supporting a second cavity mold half;
   d) a center section supported by the base axially intermediate the stationary and moving platens, the center section having a center section first face for supporting a first core mold half and a center section second face opposite the center section first face for supporting a second core mold half, the moving platen and the center section translatable along the machine axis between a mold-open position, in which the first cavity mold half is spaced axially apart from the first core mold half and the second cavity mold half is spaced axially apart from the second core mold half, and a mold-closed position, in which the first cavity mold half is in engagement with the first core mold half to define a set of first mold cavities for forming a set of molded first preforms, and in which the second cavity mold half is in engagement with the second core mold half to define a set of second mold cavities for forming a set of molded second preforms;
   e) a first take-out plate on a non-operator side of the machine, the first take-out plate moveable relative to the base between at least one first advanced position for reaching between the first cavity mold half and the first core mold half when the moving platen and center section are in the mold-open position to facilitate transfer of the first preforms from the first core mold half on the center section to retained engagement on the first take-out plate, and a first retracted position in which the first take-out plate is clear of the first cavity mold half and the first core mold half;
   f) a second take-out plate on the non-operator side of the machine, the second take-out plate moveable relative to the base between at least one second advanced position for reaching between the second cavity mold half and the second core mold half when the moving platen and the center section are in the mold-open position to facilitate transfer of the second preforms from the second core mold half on the center section to retained engagement on the second take-out plate, and a second retracted position in which the second take-out plate is clear of the second cavity mold half and the second core mold half; and
   g) a transfer shell on the non-operator side of the machine axially intermediate the first and second take-out plates, the transfer shell including a shell first face having a set of first transfer pins protruding therefrom for retaining the first preforms, and a shell second face opposite the shell first face, the shell second face having a set of second transfer pins protruding therefrom for retaining the second preforms.

2. The machine of claim 1, wherein the first take-out plate translates along a horizontal first take-out plate axis between the first advanced and retracted positions and the second take-out plate translates along a horizontal second take-out plate axis between the second advanced and retracted positions, the first and second take-out plate axes perpendicular to the machine axis.

3. The machine of claim 2, wherein the first take-out plate includes at least one set of first cooling tubes for retaining and cooling the first preforms and at least one first internal fluid conduit for conducting coolant to and from the first cooling tubes, the first cooling tubes having first open ends directed toward the center section first face when the first take-out plate is in the advanced position, and wherein the second take-out plate includes at least one set of second cooling tubes for retaining and cooling the second preforms and at least one second internal fluid conduit for conducting coolant to and from the second cooling tubes, the second cooling tubes having second open ends directed toward the center section second face when the second take-out plate is in the second advanced position.

4. The machine of claim 3, wherein the first take-out plate includes a set of set-A first cooling tubes and a set of set-B first cooling tubes, and wherein the first take-out plate is translatable to a set-A first advanced position for aligning the set-A first cooling tubes with first mold core pins of the first core mold half, and a set-B first advanced position for aligning the set-B first cooling tubes with the first mold core pins, the set-A and set-B first advanced positions offset from each other along the first take-out plate axis.

5. The machine of claim 4, wherein the second take-out plate includes a set of set-A second cooling tubes and a set of set-B second cooling tubes, and wherein the second take-out plate is translatable to a set-A second advanced position for aligning the set-A second cooling tubes with second mold core pins of the second core mold half, and a set-B second advanced position for aligning the set-B second cooling tubes with the second mold core pins, the set-A and set-B second advanced positions offset from each other along the second take-out plate axis.

6. The machine of claim 1, wherein when in the first retracted position, the first take-out plate is translatable parallel to the machine axis toward the transfer shell to a first shell-transfer position to facilitate transfer of the first preforms to retained engagement on the first transfer pins, and wherein when in the second retracted position, the second take-out plate is translatable parallel to the machine axis toward the transfer shell to a second shell-transfer position to facilitate transfer of the second preforms to retained engagement on the second transfer pins.

7. The machine of claim 1, wherein the transfer shell is rotatable about a horizontal shell axis generally perpendicular to the machine axis, the transfer shell rotatable among a load position in which the shell first face is directed axially toward the first take-out plate and the shell second face is directed axially toward the second take-out plate, a first unload position in which the shell first face is directed downwardly for releasing the first preforms from the shell, and a second unload position in which the shell second face is directed downwardly for releasing the second preforms from the transfer shell.

8. An injection molding machine for molding preforms, comprising:
   a) a machine base extending along a horizontal machine axis;
   b) a stationary platen fixed to a platen support portion of the base for supporting a first cavity mold half;
   c) a moving platen supported by the platen support portion and spaced axially apart from the stationary platen, the moving platen for supporting a second cavity mold half;
   d) a center section supported by the platen support portion axially intermediate the stationary and moving platens, the center section having a center section first face for supporting a first core mold half and a center section second face opposite the center section first face for supporting a second core mold half;
   wherein the moving platen and the center section are translatable along the machine axis between a mold-open position, in which the first cavity mold half is spaced axially apart from the first core mold half and the second cavity mold half is spaced axially apart from the second core mold half, and a mold-closed position, in which the first cavity mold half is in engagement with the first core mold half to define a set of first mold cavities for forming a set of molded first preforms, and in which the second cavity mold half is in engagement with the second core mold half to define a set of second mold cavities for forming a set of molded second preforms;
   e) a two-stage first injection unit supported by a first injection unit support portion of the base and positioned behind the stationary platen for injecting a first resin into the first mold cavities through the stationary platen, the first injection unit including a first plasticizing apparatus for plasticizing the first resin and a first plunger apparatus transversely offset from the first plasticizing apparatus for receiving the first resin from the first plasticizing apparatus and forcing the first resin into the first mold cavities through a first nozzle of the second injection unit; and
   f) a two-stage second injection unit supported by a second injection unit support portion of the base and positioned behind the moving platen for injecting a second resin into the second mold cavities through the moving platen, the second injection unit including a second plasticizing apparatus for plasticizing the second resin and a second plunger apparatus transversely offset from the second plasticizing apparatus for receiving the second resin from the second plasticizing apparatus and forcing the second resin into the second mold cavities through a second nozzle of the second injection unit, the second injection unit translatable along the machine axis between injection unit retracted and advanced positions to accommodate translation of the moving platen during movement between the mold-open and mold-closed positions.

9. The machine of claim 8, wherein the second nozzle is in a fixed position relative to the moving platen during machine operation.

10. The machine of claim 9, further comprising a sprue engagement actuator coupled to the second injection unit for holding the second nozzle in engagement with a sprue of the second cavity mold half during machine operation.

11. The machine of claim 10, wherein the sprue engagement actuator comprises at least one hydraulic cylinder connected at one end to the moving platen and at the opposite end to the second plunger apparatus.

12. The machine of claim 8, further comprising a stroke assembly for translating the moving platen and the center mold section between the mold-open and the mold-closed positions, and the second injection unit between the injection unit retracted and advanced positions.

13. The machine of claim 12, wherein the stroke assembly comprises at least one mold stroke actuator mounted to the base and coupled to the moving platen for translating the moving platen along the machine axis.

14. The machine of claim 13, wherein the stroke assembly comprises at least one injection unit stroke actuator mounted to the base and coupled to the second injection unit for translating the second injection unit along the machine axis.

15. The machine of claim 14, wherein the at least one injection unit stroke actuator is operable to translate the second injection unit along the machine axis over at least an injection unit stroke length, the injection unit stroke length equal to an axial mold stroke length traversed by the moving platen when moving between the mold-open and mold-closed positions.

16. The machine of claim 15, wherein the at least one injection unit stroke actuator provides at least a portion of an injection unit stroke force required to translate the second injection unit over the injection unit stroke length, and the at least one mold stroke actuator provides at least a portion of a mold stroke force required to translate the moving platen and the center section between the mold-open and mold-closed positions, and wherein a sum of the injection unit stroke force and the mold stroke force is provided by a combination of the mold stroke actuator and the injection unit stroke actuator.

17. The machine of claim 8, wherein the first and second injection units are interchangeable.

18. A method of operating an injection molding machine for molding preforms, comprising:
   a) plasticizing a first resin in a first plasticizing apparatus of a two-stage first injection unit supported behind a stationary platen, and plasticizing a second resin in a second plasticizing apparatus of a two-stage second injection unit supported behind a moving platen;
b) forcing the first resin from a first shooting pot transversely offset from the first plasticizing apparatus through the stationary platen and into a set of first mold cavities to form a set of molded first preforms, the first mold cavities defined by a first cavity mold half supported by the stationary platen and a first core mold half supported by a center mold section; c) forcing the second resin from a second shooting pot transversely offset from the second plasticizing apparatus through the moving platen and into a set of second mold cavities to form a set of molded second preforms, the second mold cavities defined by a second cavity mold half supported by the moving platen and a second core mold half supported by the center mold section opposite the first core mold half; and
d) after step (c), energizing a stroke assembly to open the mold, the stroke assembly including at least one injection unit stroke actuator coupled to the second injection unit and at least one mold stroke actuator coupled to the moving platen and the center section, wherein the at least one injection unit stroke actuator provides at least a portion of an injection unit stroke force required to translate the second injection unit away from the stationary platen when opening the mold, and the at least one mold stroke actuator provides at least a portion of a mold stroke force required to translate the moving platen and the center section away from the stationary platen when opening the mold.

19. An injection molding machine for molding articles, comprising:
a) a machine base extending along a horizontal machine axis;
b) a stationary platen fixed to the base for supporting a first cavity mold half having first recesses for forming a first outer surface of a set of first molded articles;
c) a moving platen supported by the base for supporting a second cavity mold half having second recesses for forming a second outer surface of a set of second molded articles; and
d) a center section supported by the base axially intermediate the stationary and moving platens, the center section including:
   (i) a center section first face for supporting a first core mold half having first mold core pins for forming a first inner surface of the first molded articles;
   (ii) a center section second face opposite the center section first face for supporting a second core mold half having second mold core pins for forming a second inner surface of the second molded articles; and
   (iii) an ejector mechanism disposed between the center section first face and the center section second face;
wherein the moving platen and the center section are translatable along the machine axis between a mold-closed position and a mold-open position,
wherein when in the mold-closed position, the first cavity mold half is in engagement with the first core mold half for forming the set of first molded articles, and the second cavity mold half is in engagement with the second core mold half for forming the set of second molded articles;
and wherein when in the mold-open position, the first cavity mold half is spaced axially apart from the first core mold half and the second cavity mold half is spaced axially apart from the second core mold half, with the first molded articles retained on the first mold core pins and the second molded articles retained on the second mold core pins, the ejector mechanism movable to an ejection position for pushing the first molded articles off the first mold core pins and pushing the second molded articles off the second mold core pins.

20. The machine of claim 19, further comprising a first take-out plate moveable relative to the base between a first advanced position and a first retracted position, the first take-out plate reaching between the first cavity mold half and the first core mold half when the moving platen and center section are in the mold-open position to receive the first molded articles pushed from the first mold core pins by the ejector mechanism, and the first take-out plate clear of the first cavity mold half and the first core mold half when in the first retracted position.

21. The machine of claim 20, further comprising a second take-out plate moveable relative to the base between a second advanced position and a second retracted position, the second take-out plate reaching between the second cavity mold half and the second core mold half when the moving platen and center section are in the mold-open position to receive the second molded articles pushed from the second mold core pins by the ejector mechanism, and the second take-out plate clear of the second cavity mold half and the second core mold half when in the second retracted position.

22. The machine of claim 21, wherein the ejector mechanism comprises a first ejection actuator behind the center section first face, the first ejection actuator movable to a first actuator advanced position for breaking the first molded articles free from the first mold core pins, and a second ejection actuator behind the center section second face, the second ejection actuator movable to a second actuator advanced position for breaking the second molded articles free from the second mold core pins.

23. A method of operating an injection molding machine configured to mold preforms, comprising:
a) translating a first take-out plate perpendicular to a machine axis to a first advanced position between a first cavity mold half supported by a stationary platen and a first core mold half supported by a center section, and translating a second take-out plate perpendicular to the machine axis to a second advanced position between a second cavity mold half supported by a moving platen and a second core mold half supported by the center section opposite the first core mold half;
b) after step (a), transferring a set of molded first preforms from the first core mold half to retained engagement on the first take-out plate, wherein transferring the set of molded first preforms includes activating a first ejector apparatus of the center section, and transferring a set of molded second preforms from the second core mold half to retained engagement on the second take-out plate, wherein transferring the set of molded second preforms includes activating a second ejector apparatus of the center section;
c) after step (b), translating the first take-out plate to a first retracted position clear of the first cavity mold half and the first core mold half, and translating the second take-out plate to a second retracted position clear of the second cavity mold half and the second core mold half; and
d) after step (c), transferring the first and second preforms from the first and second take-out plates to retained engagement on a transfer shell axially intermediate the first and second take-out plates.

24. The method of claim 23, further comprising, after step (c) and prior to step (d), translating each of the first and second take-out plates parallel to the machine axis toward the transfer shell.

25. The method of claim 23, further comprising prior to step (d), rotating the transfer shell about a horizontal shell axis to orient the transfer shell in a load position in which first and second shell faces are oriented generally vertically, and wherein transferring the first preforms from the first take-out plate to the transfer shell in step (d) comprises transferring the first preforms to a set of first transfer pins protruding from a shell first face of the transfer shell, and wherein transferring the second preforms from the second take out plate to the transfer shell in step (d) comprises transferring the second preforms to a set of second transfer pins protruding from a shell second face of the transfer shell.

26. The method of claim 25, further comprising, after the first and second preforms have been transferred to the transfer shell, rotating the transfer shell about the horizontal shell axis to a first unload position in which the shell first face is directed downwardly, and releasing the first preforms from the transfer shell, and rotating the transfer shell about the shell axis to a second unload position in which the shell second face is directed downwardly, and releasing the second preforms from the transfer shell.

27. The method of claim 23, wherein activating the first ejector apparatus of the center section includes activating a first boost actuator for breaking away the first preforms from engagement with first mold core pins of the first core mold half, and activating the second ejector apparatus of the center section includes activating a second boost actuator for breaking away the second preforms from engagement with second mold core pins of the second mold core half.

28. The method of claim 27, wherein activating the first ejector apparatus of the center section further includes activating a first escape actuator for pushing the first preforms further from the first mold core pins toward the first take-out plate, and activating the second ejector apparatus of the center section further includes activating a second escape actuator for pushing the second preforms further from the second mold core pins toward the second take-out plate.

\* \* \* \* \*